April 29, 1952  K. H. FOSKETT  2,595,132
PRESSED METAL METER BOX
Filed Feb. 16, 1949

Inventor
Kenneth H. Foskett
by Roberts, Cushman & Grover
attys.

Patented Apr. 29, 1952

2,595,132

UNITED STATES PATENT OFFICE 2,595,132

PRESSED METAL METER BOX

Kenneth H. Foskett, Manchester, N. H., assignor to Anchor Manufacturing Company, Boston, Mass., a corporation of Massachusetts Application February 16, 1949, Serial No. 76,747

1 Claim. (Cl. 220—44)

This invention relates to meter boxes of the type having a flange around the open front of the box to constitute a meter seat, the meter usually having a flange of the same size so that the meter may be secured to the box by a channel ring fitting over the abutting flanges. When meters are installed outdoors it is practically impossible to prevent some water from seeping in. Consequently it has been proposed to provide recesses in the box flange at spaced intervals around the periphery of the box, usually at 90° intervals, so that the two flanges do not seat tightly together at these locations. Thus in any one of four positions of the box there is a drain opening at the bottom of the box.

While it is easy to provide these recesses in diecast boxes, heretofore no practicable method has been found to produce them in drawn sheet-metal boxes. It is not feasible to form them in the drawing operation and if the flange is indented after the box is drawn the flange is deformed to such extent that the aforesaid retaining ring often does not fit over the two flanges.

Objects of the present invention are to provide a method of making flanges with one or more recesses which is simple and economical in operation and which produces uniform flanges without undesirable distortions.

According to the present invention ridges on the forward side of the flanges are embossed from the back of the flanges, with spaces between the ends of the ridges, instead of attempting to force one or more parts of the flange backwardly to form recesses. More specifically the method comprises drawing the box from a piece of sheet metal with an out-turned flange extending around the box, placing the forward face of the flange against a die having one or more elongate recesses extending along the flange with spaces between the recesses, embossing the flange with a complementary die having corresponding ridges extending into said recesses, and then trimming the outer edge of the flange to eliminate irregularities formed in the preceding steps.

For the purpose of illustration a typical embodiment of the invention is shown in the accompanying drawings in which Fig. 1 is a front view of a box made according to the present invention;

Figure 1:
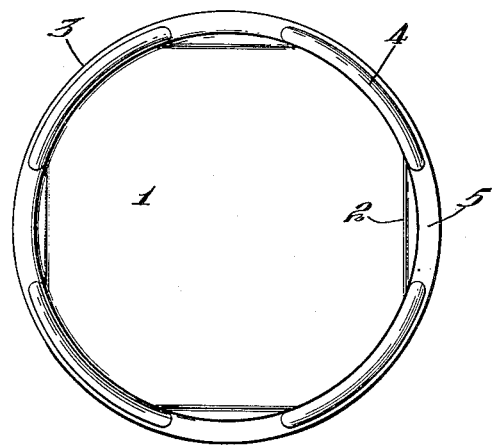
Figure 2:
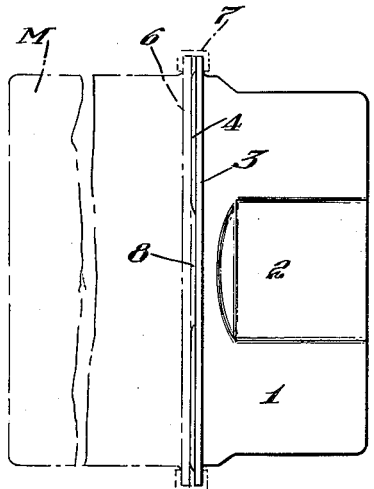
Fig. 2 is a side elevation of the box showing a meter and meter ring in broken lines.
Figure 3:
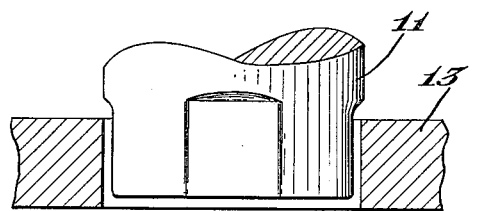
Fig. 3 illustrates the step of drawing the box from a circular disc of sheet material.
Figure 4:
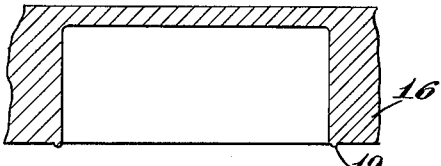
Fig. 4 illustrates the step of embossing the ridges on the flange.
Figure 5:
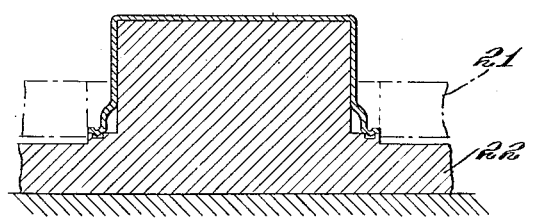
Fig. 5 shows the step of trimming the edge of the flange.

The particular embodiment of the invention chosen for the purpose of illustration comprises a circular box 1 having flat sides 2, and a peripheral flange 3, the flange having four ridges 4 separated by spaces 5. When installed the box contains meter terminal clips mounted on the bottom of the box, these terminals usually comprising jaws adapted to receive blades projecting rearwardly from a meter M. To mount the meter on the box, the jaws are plugged into the terminal clips with the peripheral flange 6 of the meter seating on the ridges 4, the meter being held in position by means of a ring 7 in the usual manner. When thus installed there are four drainage spaces 8 at the four flat parts 5 of the flange 3, the lowermost space serving as a drainage opening to drain off any water which may leak into the box.

The drawing operation is effected by male and female dies 11 and 12 together with a pressure pad 13. The metal disc to be drawn is seated in a recess 14 in the die 12 after which the male die 11 and the pressure pad 13 descend to shape the box, the pressure pad holding the periphery of the disc in a horizontal plane to form the flange 3. Similar sizing dies may be applied to the box after the drawing operation in order to shape the box more accurately.

After the box is drawn and accurately shaped the ridges 4 are embossed with two dies 16 and 17, the die 17 having four recesses 18 to receive the ridges 4 and the die 16 having corresponding ridges 19 to force the metal of the rim 3 into the recesses 18.

Figure 6:
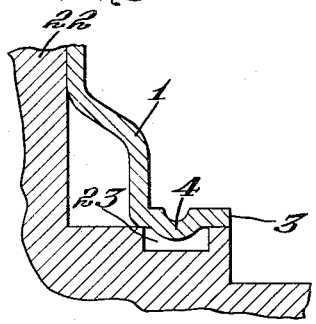
Fig. 6 is an enlarged section taken on the same plane as Fig. 5.

After the ridges 4 are embossed in the flange the outer edge of the flange is cut with two dies 21 and 22, thereby trimming the outer edge of the flange to eliminate irregularities formed in the shaping and embossing steps. As shown in Fig. 6 the die 22 has an annular recess 23 to accommodate the ridges 4 while the edge is being trimmed.

It should be understood that the present disclosure is for the purpose of illustration only and that this invention includes all modifications and equivalents which fall within the scope of the appended claim.

I claim:

A pressed-metal meter box comprising a cupped body portion and an out-turned flange around its mouth, the flanges having embossed ridges extending circumferentially around the outer face of the flange at spaced intervals to leave drainage spaces between the adjacent ends thereof, said ridges being spaced from both the inner and outer edges of the flange to provide flat surfaces perpendicular to the axis of the box which extend continuously around the flange inside and outside the ridges.

KENNETH H. FOSKETT.

REFERENCES CITED

The following references are of record in the file of this patent:

UNITED STATES PATENTS

| Number | Name | Date |
|---|---|---|
| 577,794 | Stickney | Feb. 23, 1897 |
| 1,257,569 | Winter | Feb. 26, 1918 |
| 1,689,641 | Pickles | Oct. 30, 1928 |
| 1,969,499 | Bradshaw et al. | Aug. 7, 1934 |
| 2,285,903 | Clark | June 9, 1942 |